(12) United States Patent
Cho et al.

(10) Patent No.: US 11,424,813 B2
(45) Date of Patent: Aug. 23, 2022

(54) METHOD FOR DETERMINING OPTIMAL BEAM AND AN ELECTRONIC DEVICE THEREOF

(71) Applicant: Samsung Electronics Co., Ltd., Suwon-si (KR)

(72) Inventors: Yongsang Cho, Suwon-si (KR); Sangho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 16/728,165

(22) Filed: Dec. 27, 2019

(65) Prior Publication Data

US 2020/0212991 A1 Jul. 2, 2020

(30) Foreign Application Priority Data

Dec. 27, 2018 (KR) .................. 10-2018-0170763

(51) Int. Cl.
*H04B 7/08* (2006.01)
*H04B 17/309* (2015.01)
*H04B 17/373* (2015.01)
*H04B 7/06* (2006.01)
*H04L 7/00* (2006.01)

(52) U.S. Cl.
CPC ........... *H04B 7/088* (2013.01); *H04B 17/309* (2015.01); *H04B 17/373* (2015.01); *H04B 7/0617* (2013.01); *H04L 7/0008* (2013.01)

(58) Field of Classification Search
CPC .... H04B 7/088; H04B 17/309; H04B 17/373; H04B 7/0617; H04B 7/0695; H04B 17/382; H04L 7/0008
See application file for complete search history.

(56) References Cited

U.S. PATENT DOCUMENTS

| 10,277,349 | B1* | 4/2019 | Kotecha | H04J 11/0086 |
|---|---|---|---|---|
| 2010/0248656 | A1* | 9/2010 | Zhou | H04B 7/0874 |
| | | | | 455/101 |
| 2012/0045024 | A1* | 2/2012 | Cui | H04L 1/06 |
| | | | | 375/341 |
| 2017/0331577 | A1 | 11/2017 | Parkvall et al. | |

(Continued)

FOREIGN PATENT DOCUMENTS

| JP | 2015185953 A | 10/2015 |
|---|---|---|
| KR | 10-2017-0004183 A | 1/2017 |

(Continued)

OTHER PUBLICATIONS

Apple Inc., "On beam correspondence requirement", 3GPP TSG-RAN4 WG Meeting #89, Nov. 12-16, 2018, R4-1815823, 10 pages.

(Continued)

*Primary Examiner* — Yuwen Pan
*Assistant Examiner* — Fatuma G Sherif

(57) ABSTRACT

To generate a beam book, an operating method of an electronic device may include acquiring measurement information of a plurality of antenna in a first direction, determining offset values between phase values per antenna for the first direction, determining phase values which satisfy the offset values and maximize receive power for the first direction, and determining phase values for a second direction, based on the offset values and the phase values for the first direction.

18 Claims, 20 Drawing Sheets

(56) References Cited

U.S. PATENT DOCUMENTS

2018/0109303 A1     4/2018   Yoo et al.
2018/0288645 A1*   10/2018   Lee .................... H04B 7/0478
2019/0173563 A1     6/2019   Kakishima et al.
2019/0363809 A1     11/2019   Yoon et al.

FOREIGN PATENT DOCUMENTS

KR    10-2018-0087563 A    8/2018
WO      2018/230984 A1    12/2018

OTHER PUBLICATIONS

Javier Campos, "Understanding the 5G NR Physical Layer", Keysight Technologies, Nov. 1, 2017, 111 pages.
International Search Report dated Apr. 21, 2020 in connection with International Patent Application No. PCT/KR2019/018309, 3 pages.
Written Opinion of the International Searching Authority dated Apr. 21, 2020 in connection with International Patent Application No. PCT/KR2019/018309, 5 pages.
"Underfitting v. Overfitting", https://scikit-learn.org/stable/auto_examples/model_selection/plot_underfitting_overfitting.html, 2 pages.

* cited by examiner

1110

| -90 | -80.5 | -78.8 | -84 | -79.3333 |
|---|---|---|---|---|
| -81.2 | -77 | -79 | -72 | -74 |
| -76.8333 | -73 | -71.3333 | -67.9579 | -73 |
| -77 | -77 | -85 | -78 | -75.4 |
| -79.7143 | -84 | -79 | -88 | -80 |

1120

1120a

| -392.21 | -6.45 | -0.47 | -3.41 | -1.12 |
|---|---|---|---|---|
| 1.01 | -6.16 | -6.30 | -1.70 | -3.30 |
| -18.19 | 2.20 | -0.02 | -5.13 | 7.19 |
| -2.79 | 0.85 | 1.43 | -2.32 | 2.19 |
| 3.09 | 0.15 | -6.02 | -0.18 | 4.38 |

| -383.38 | -8.18 | -6.57 | 0.00 | 0 |
|---|---|---|---|---|
| -1.61 | -6.45 | -2.06 | 0 | 0 |
| -13.37 | -0.02 | 0 | 0 | 0 |
| -1.49 | 0 | 0 | 0 | 0 |
| 0 | 0 | 0 | 0 | 0 |

⇩

1620

| -87.0976 | -82.406 | -77.7734 | -76.7957 | -78.0178 |
|---|---|---|---|---|
| -80.9108 | -76.8984 | -73.0294 | -72.4009 | -73.6315 |
| -76.5902 | -73.6734 | -71.0344 | -70.9651 | -72.2057 |
| -77.5081 | -75.6825 | -74.2666 | -74.7495 | -75.9962 |
| -79.7972 | -78.6439 | -77.9803 | -78.801 | -80.0493 |

| -87.1596 | -82.4726 | -77.8543 | -76.9016 | -78.1455 |
|---|---|---|---|---|
| -80.7855 | -76.7702 | -72.9035 | -72.2879 | -73.5329 |
| -76.5798 | -73.6517 | -71.0015 | -70.9317 | -72.1787 |
| -77.6353 | -75.7946 | -74.3614 | -74.8378 | -76.0871 |
| -79.7739 | -78.6054 | -77.9245 | -78.7388 | -79.9896 |

1720a

| -87.1596 |  | -77.8543 |  | -78.1455 |
|---|---|---|---|---|
|  |  |  |  |  |
| -76.5798 |  | -71.0015 |  | -72.1787 |
|  |  |  |  |  |
| -79.7739 |  | -77.9245 |  | -79.9896 |

1720b

| -87.1596 |  |  |  | -78.1455 |
|---|---|---|---|---|
|  |  | -72.9035 |  |  |
| -76.5798 |  |  |  | -72.1787 |
|  |  | -74.3614 |  |  |
| -79.7739 |  |  |  | -79.9896 |

1720c

|  |  | -77.8543 |  |  |
|---|---|---|---|---|
| -80.7855 |  |  |  | -73.5329 |
|  |  | -71.0015 |  |  |
| -77.6353 |  |  |  | -76.0871 |
|  |  | -77.9245 |  |  |

FIG.17

METHOD FOR DETERMINING OPTIMAL BEAM AND AN ELECTRONIC DEVICE THEREOF

CROSS-REFERENCE TO RELATED APPLICATION

This application is based on and claims priority under 35 U.S.C. § 119 to Korean Patent Application No. 10-2018-0170763 filed on Dec. 27, 2018 in the Korean Intellectual Property Office, the disclosure of which is incorporated by reference herein in its entirety.

BACKGROUND

1. Field

The disclosure relates generally to a method and an electronic device for determining an optimal beam.

2. Description of Related Art

To meet the increasing demand for wireless data traffic since deployment of a 4th generation (4G) communication system, efforts have been made to develop an improved 5th generation (5G) or a pre-5G communication system. To achieve a wide bandwidth, the 5G communication system may use a millimeter wave (mmWave) frequency (e.g., over 24~86 GHz) band.

A received signal strength is proportional to a square of a wavelength. As the wavelength gets shorter, diffraction lowers and it is difficult to penetrate through an obstacle. A beamforming technology may be used to overcome high signal attenuation of a receiving stage caused by such properties of the high frequency. The beamforming technology may concentrate signal energy in a specific direction by means of a plurality of antennas.

If wireless communication employs the beamforming technology in an array structure using a directional antenna, the signal strength may improve and concurrently a beamwidth may reduce. By means of the beamforming, a transmitter may transmit a signal toward a specific location, and a receiver may receive the signal from the specific location. Since the beamwidth is narrow, wireless communication performance may heavily depend on the signal transmission direction or the signal reception direction. Hence, it is necessary to search for an optimal transmit/receive beam pair between a gNodeB (gNB) and an electronic device 101, to improve the wireless communication performance.

For example, if the number of transmit beams is NT, and the number of receive beams is NR, the electronic device may receive a synchronization signal/physical broadcast channel block (SSB) set including NT-ary SSBs corresponding to the transmit beams, for NR times, and find the optimal transmit/receive beam pair. A transmission period of the SSB set is about 5~160 ms, which may be mostly set to 20 ms. If the transmission period of the SSB set is TSSB, a receive beam search time may take NR×TSSB. Thus, if the electronic device searches the signal strength using all of the receive beams, it takes long time and may cause considerable current consumption.

SUMMARY

To address the above-discussed deficiencies of the prior art, it is a primary aspect of the disclosure to provide a method and an electronic device for determining an optimal beam without searching all of receive beams.

According to an embodiment of the disclosure, a method for operating an electronic device may include receiving a sync signal or a reference signal over some of receive beams, determining receive signal quality values of the receive beams based on measurement results of some of the receive beams, and determining an optimal receive beam based on the receive signal quality values.

According to an embodiment of the disclosure, an electronic device may include a memory, and a processor operatively coupled with the memory. The processor may be configured to receive a sync signal or a reference signal over some of receive beams, determine receive signal quality values of the receive beams based on measurement results of some of the receive beams, and determine an optimal receive beam based on the receive signal quality values.

Other aspects, advantages, and salient features of the disclosure will become apparent to those skilled in the art from the following detailed description, which, taken in conjunction with the annexed drawings, discloses an embodiment of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a diagram of an example of change-of-basis results of measurement values according to an embodiment;

FIG. 16 illustrates a diagram of an example of predicted measurement values determined from a change-of-basis matrix according to an embodiment;

FIG. 17 illustrates a diagram of examples of measurement values of sampled receive beams according to an embodiment;

Throughout the drawings, like reference numerals will be understood to refer to like parts, components and structures.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments are explained in detail by referring to the attached drawings.

Figure 1:
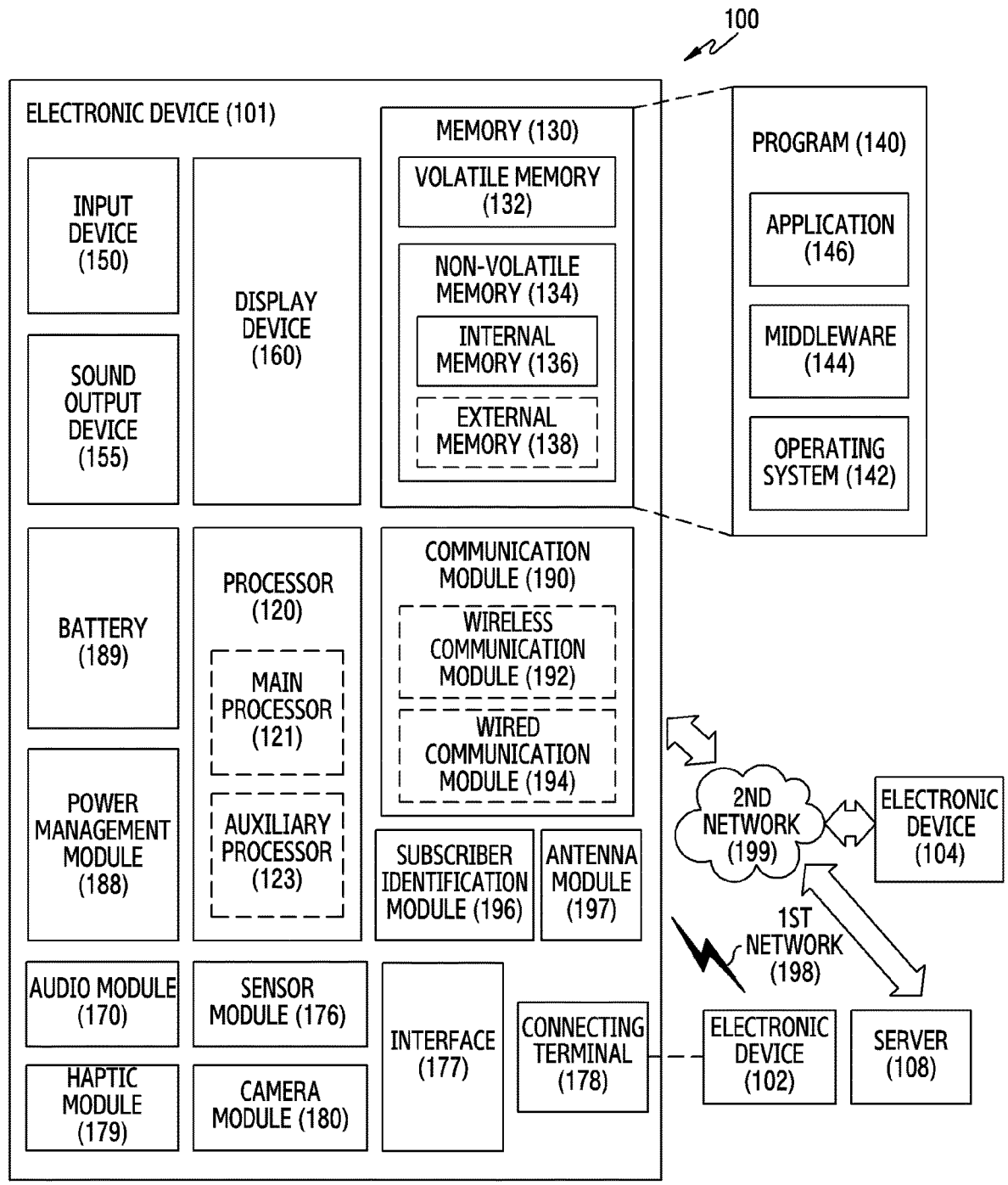
FIG. 1 illustrates a block diagram of an electronic device in a network environment according to an embodiment of the disclosure.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
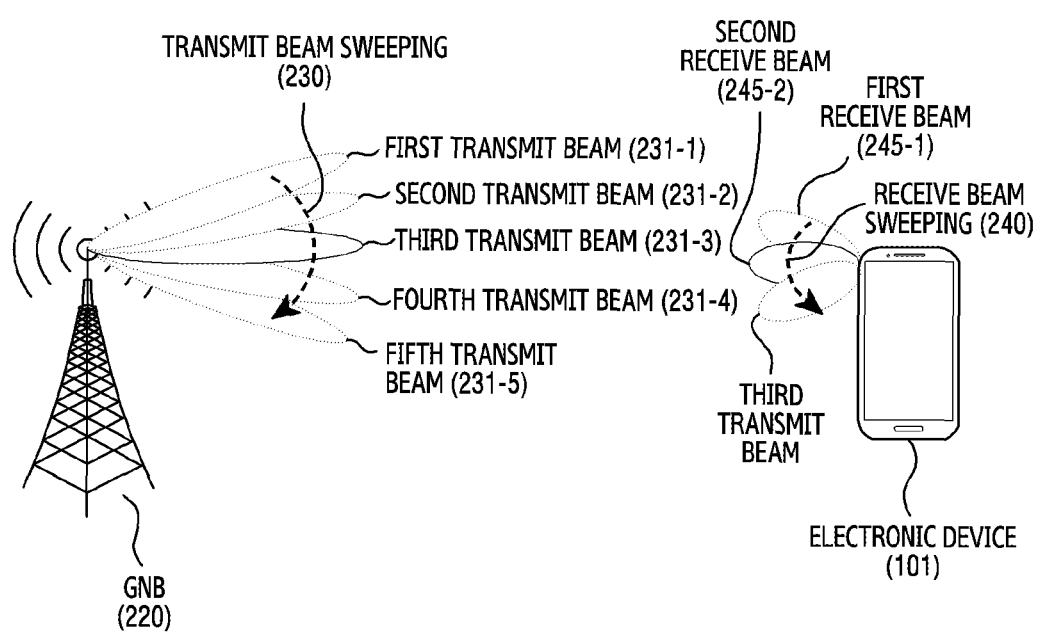
FIG. 2 illustrates a diagram of an embodiment of operations for connecting wireless communication between a gNodeB (gNB) and an electronic device in a network using a directional beam for the wireless connection.

FIG. 2 illustrates a diagram of an embodiment of operations for connecting wireless communication between a gNodeB (gNB) or a transmission reception point (TRP) 220 and an electronic device 101 in a network using a directional beam for the wireless connection. The gNB 220 may perform beam detection with the electronic device 101, for the wireless communication connection. In this embodiment, for the beam detection, the gNB 220 may sequentially transmit a plurality of transmit beams, for example, first through fifth transmit beams 231-1 through 231-5 of different directions, and thus perform at least one transmit beam sweeping 230.

The first through fifth transmit beams 231-1 through 231-5 may include at least one synchronization sequences (SS)/physical broadcast channel (PBCH) block. The SS/PBCH block may be used to measure a channel or a beam level of the electronic device 101 on a periodic basis.

In another embodiment, the first through fifth transmit beams 231-1 through 231-5 may include at least one channel state information (CSI)-reference signal (RS). The CSI-RS is a reference signal which may be set flexibly by the gNB 220, and may be transmitted periodically/semi-persistently or aperiodically. The electronic device 101 may measure the channel or the beam level using the CSI-RS.

The transmit beams may form a radiation pattern having a selected beamwidth. For example, the transmit beams may have a broad radiation pattern having a first beamwidth, or a sharp radiation pattern having a second beamwidth which is narrower than the first beamwidth. For example, the transmit beams including the SS/PBCH block may have a broader radiation pattern than the transmit beam including the CSI-RS.

While the gNB 220 conducts the transmit beam sweeping 230, the electronic device 101 may perform receive beam sweeping 240. For example, while the gNB 220 conducts the first transmit beam sweeping 230, the electronic device 101 may receive a signal of the SS/PBCH block from at least one of the first through fifth transmit beams 231-1 through 231-5 by fixing the first receive beam 245-1 in a first direction. While the gNB 220 performs the second transmit beam sweeping 230, the electronic device 101 may receive a signal of the SS/PBCH block from the first through fifth transmit beams 231-1 through 231-5 by fixing the second receive beam 245-2 in a second direction. As such, based on signal reception results through the receive beam sweeping 240, the electronic device 101 may select communicable receive beam (e.g., the second receive beam 245-2) and transmit beam (e.g., the third transmit beam 231-3).

As above, after determining the communicable transmit and receive beams, the gNB 220 and the electronic device 101 may transmit and/or receive fundamental information for cell configuration, and thus set information for additional beam management. For example, the beam management information may include detailed information of the set beam, and setting information of the SS/PBCH block, the CSI-RS, or the additional reference signal.

In addition, the electronic device 101 may continuously monitor the channel and the beam level using at least one of the SS/PBCH block and the CSI-RS of the transmit beam. The electronic device 101 may adaptively select the beam of good beam quality through the monitoring. Selectively, if the communication is disconnected due to movement of the electronic device 101 or beam blocking, the electronic device 101 may determine a communicable beam by re-performing the beam sweeping.

Figure 3:
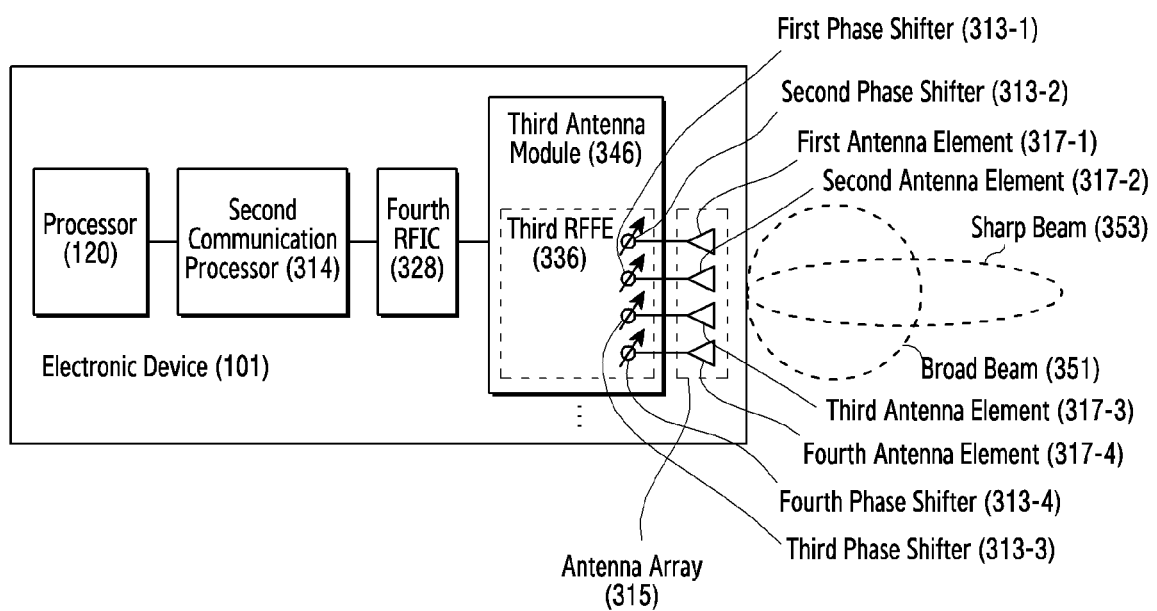
FIG. 3 illustrates a diagram of a block diagram of an electronic device for 5th generation (5G) network communication according to an embodiment.

FIG. 3 illustrates a diagram of a block diagram of an electronic device 101 for 5th generation (5G) network communication according to an embodiment. The electronic device 101 may include various components of FIG. 3, but the electronic device 101 of FIG. 3 includes a processor 120, a second communication processor 314, a fourth radio frequency integrated circuit (RFIC) 328, and at least one third antenna module 346, to ease the understanding.

In this embodiment, the third antenna module 346 may include first through fourth phase shifters 313-1 through 313-4 and/or first through fourth antenna elements 317-1 through 317-4. Each one of the first through fourth antenna elements 317-1 through 317-4 may be electrically connected to individual one of the first through fourth phase shifters 313-1 through 313-4. The first through fourth antenna elements 317-1 through 317-4 may construct at least one antenna array 315.

By controlling the first through fourth phase shifters 313-1 through 313-4, the second communication processor 314 may control phases of transmitted and/or received signals via the first through fourth antenna elements 317-1 through 317-4 and thus generate a transmit beam and/or a receive beam in the selected direction.

According to an embodiment, the third antenna module 346 may form a beam 351 of a broad radiation pattern (hereafter, referred to as a broad beam) or a beam 352 of a sharp radiation pattern (hereafter, referred to as a sharp beam), according to the number of the antenna elements being used. For example, the third antenna module 346 may form the sharp beam 352 if all of the first through fourth antenna elements 317-1 through 317-4 are used, and may form the broad beam 351 if only the first antenna element 317-1 and the second antenna element 317-2 are used. The broad beam 351, which has broader coverage than the sharp beam 352 but achieves a small antenna gain, may be more effective for the beam search. By contrast, the sharp beam 352, which has narrower coverage than the broad beam 351 but achieves a greater antenna gain, may improve communication performance.

According to an embodiment, the second communication processor 314 may use the sensor module 176 (e.g., a 9-axis sensor, a grip sensor, or a GPS) for the beam search. For example, the electronic device 101 may adjust a beam search location and/or a beam search period, based on a position and/or a movement of the electronic device 101 using the sensor module 176. For example, if a user grips the electronic device 101, the second communication processor 314 may identify a portion gripped by the user, using a grip sensor, and thus select an antenna module of better communication performance from a plurality of the third antenna modules 346.

According to an embodiment of the disclosure, an electronic device (e.g., the electronic device 101, the gNB 220) may include a memory (e.g., the memory 130), and a processor (e.g., the processor 120) operatively coupled with the memory, wherein the processor may be configured to receive a sync signal or a reference signal over some of receive beams, determine receive signal quality values of the receive beams based on measurement results of some of the receive beams, and determine an optimal receive beam based on the receive signal quality values.

According to an embodiment of the disclosure, the processor (e.g., the processor 120) may predict the receive signal quality values based on correlations of the receive beams.

According to an embodiment of the disclosure, some of the receive beams are determined to minimize correlations of the some receive beams.

According to an embodiment of the disclosure, the processor (e.g., the processor 120) may determine a first matrix, determine a second matrix, using an inverse change of basis of the first matrix, and identify values of elements of the second matrix.

According to an embodiment of the disclosure, the processor (e.g., the processor 120) may determine the first matrix to minimize an error between at least one element value corresponding to a position of at least one receive beam of some of the receive beams and at least one receive signal quality value of some of the receive beams among the elements of the second matrix.

According to an embodiment of the disclosure, the processor (e.g., the processor 120) may estimate some of the element values of the first matrix, and determine other elements values to 0.

According to an embodiment of the disclosure, the processor (e.g., the processor 120) may estimate some of the element values in zigzags from a first left and first top element.

According to an embodiment of the disclosure, the number of the some elements may be adjusted based on the number of occurrences in which a first receive signal quality value measured for a first receive beam corresponding to a maximum value of receive signal quality values predicted based on correlations of the receive beams is smaller than a second receive signal quality value measured for a second receive beam corresponding to a maximum value of receive signal quality values of the measurement results of some of the receive beams.

According to an embodiment of the disclosure, the processor (e.g., the processor 120) may receive a sync signal or a reference signal using a first receive beam corresponding to a maximum value of the receive signal quality values, identify a first receive signal quality value of the first receive beam by measuring the sync signal or the reference signal, and determine the optimal receive beam based on the first receive signal quality value.

According to an embodiment of the disclosure, the processor (e.g., the processor 120) may identify a second receive beam using a second receive beam corresponding to a maximum value of receive signal quality values of the measurement results of some of the receive beams, and if the second receive signal quality value is greater than the first receive signal quality value, select the first receive beam as the optimal receive beam, and if the second receive signal quality value is smaller than or equal to the first receive signal quality value, selects the second receive beam as the optimal receive beam.

Various beams may be formed using a phase shift of the antenna array 315. According to an embodiment, the beamforming may be applied to not only the transmission and the reception of the gNB (e.g., the gNB 220 of FIG. 2) but also the transmission and the reception of the electronic device 101. The beamforming may be performed with a sharp beamwidth to extend a signal propagation distance. Due to the sharp beamwidth, efficient communication may be achieved by refining both of the transmit beam of the gNB and the receive beam of the electronic device 101 and finding an optimal transmit and receive beam pair. Finding the transmit beam or the receive beam may be referred to as beam search.

Figure 4:
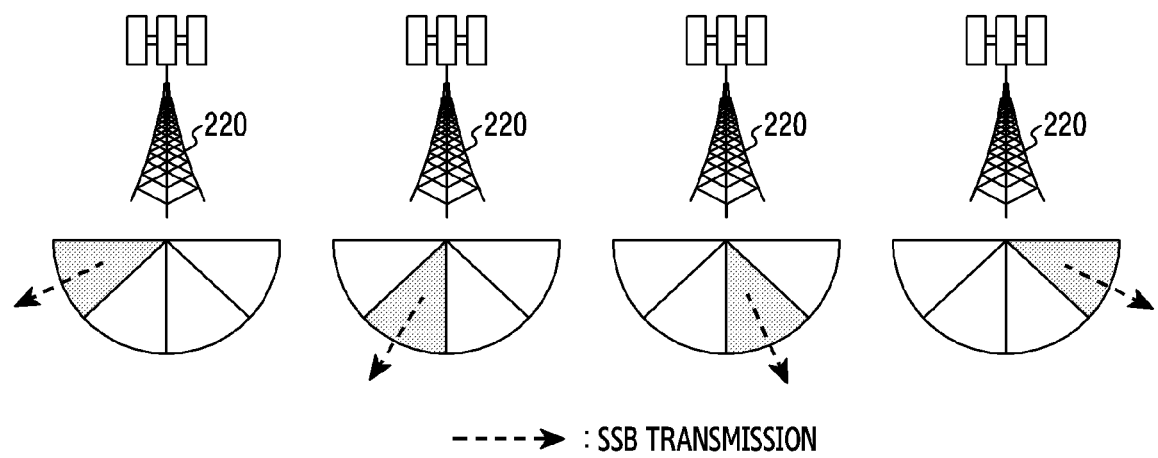
FIG. 4 illustrates a diagram of an example of synchronization signal/physical broadcast channel block (SSB) transmission of a gNB in a 5G network according to an embodiment.

For the beam search, the gNB 220 may repeatedly transmit an SSB as shown in FIG. 4.

FIG. 4 illustrates a diagram of an example of SSB transmission of a gNB in a 5G network according to an embodiment.

In FIG. 4, with four different transmit beams, the gNB transmits four SSBs over different beams. Referring to FIG. 4, the gNB 220 may periodically transmit SSBs corresponding to the number (e.g., four) of formable transmit beams as one set. The SSB of one set may be referred to as an SSB burst or an SSB set. A transmission period of the SSB set may vary, for example, may be set to 20 ms.

According to an embodiment, each SSB may correspond to each transmit beam. Each SSB may include identification information of the corresponding transmit beam. For example, the identification information of the transmit beam may be an index of the SSB. The index of the SSB may be represented using at least one of system information or a demodulation reference signal (DMRS) transmitted over a broadcast channel of the SSB.

Figure 5:
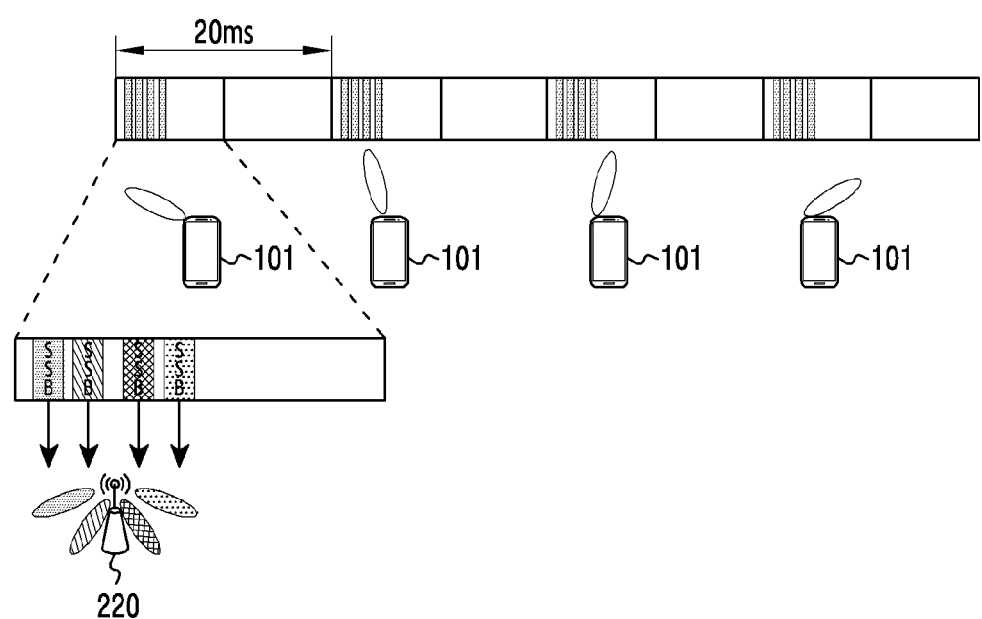
FIG. 5 illustrates an example of SSB reception of an electronic device in a 5G network according to an embodiment.

FIG. 5 illustrates a diagram of an example of SSB reception of an electronic device in a 5G network according to an embodiment. In FIG. 5, with four different receive beams, the electronic device 101 finds an optimal transmit and receive beam pair.

Referring to FIG. 5, the electronic device 101 according to an embodiment may receive and measure each SSB, and determine a transmit beam of the gNB 220 and a receive beam of the electronic device 101 based on measurement results. According to an embodiment, the transmission period of the SSB set may be typically set to 20 ms. For example, the transmission period of the SSB set may be adjusted in a range of 5 through 160 ms. The electronic device 101 may measure a signal of the SSB set using the formable receive beams one by one with respect to each SSB set, and find an optimal receive beam for the transmit beams of the gNB 220 used to transmit the SSB set. According to an embodiment to be explained, the electronic device 101 may determine the optimal receive beam using the measurement results of some receive beams, with small power consumption for shorter time than searching all the receive beams.

Figure 6:
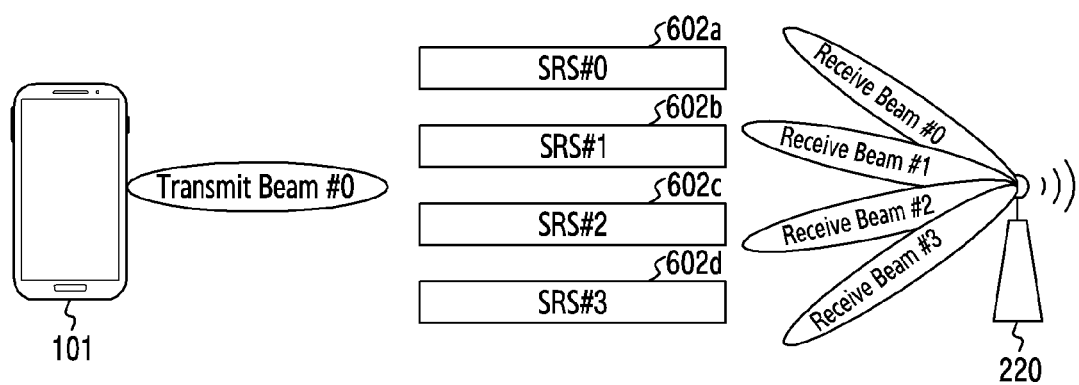
FIG. 6 illustrates a diagram of an example of receive beam sweeping to determine a receive beam of a gNB in a 5G network according to an embodiment.

FIG. 6 illustrates a diagram of an example of receive beam sweeping to determine a receive beam of a gNB in a 5G network according to an embodiment. Referring to FIG. 6, not only a receive beam of an electronic device 101 but also a receive beam of a gNB (e.g., the gNB 220 of FIG. 2) for uplink communication are determined according to an embodiment. For example, if reciprocity of an uplink channel and a downlink channel is ensured and a beam used for the transmission is also used for the reception, a transmit beam of the same direction as the optimal receive beam of the electronic device 101 and a receive beam of the same direction as the optimal transmit beam of the gNB may be used as the optimal transmit beam and receive beam for the uplink communication. For example, if the channel reciprocity is not ensured, a separate beam determining procedure may be required.

According to an embodiment, the electronic device 101 may transmit sounding reference signals (SRSs) (e.g., SRS #0, SRS #1, SRS #2, SRS #3) using at least one transmit beam (e.g., a transmit beam #0). Each SRS may be transmitted over different time or frequency resources 602*a* through 602*d* on one transmit beam (e.g., a transmit beam #2). The gNB 220 may receive the SRSs (e.g., SRS #0, SRS #1, SRS #2, SRS #3) transmitted using at least one transmit beam, using different receive beams (e.g., a receive beam #0, a receive beam #1, a receive beam #2, a receive beam #3). The gNB 220 may apply different receive beams to the SRSs transmitted over the different resources 602*a* through 602*d*, measure receive signal qualities, and determine an optimal receive beam corresponding to one transmit beam of the electronic device 101 based on the measured receive signal qualities. If the operations of FIG. 6 are repeated as many as the formable transmit beams of the electronic device 101, an optimal beam pair for the uplink communication may be determined.

Unless the electronic device 101 is moving fast, a distance between the gNB and the electronic device 101 may be greater than a moving distance of the electronic device 101 per transmission period of the SSB set or the SRSs. Accordingly, the transmit beam or the receive beam of the gNB selected as the optimal beam pair may not change greatly. For example, if the distance between the electronic device 101 and the gNB is 30 m and the electronic device 101 moves at 100 km/h for 20 ms, it may be assumed that an azimuth change of the transmit beam or the receive beam of the gNB may be 1° and the transmit beam or the receive beam of the gNB may not change often. For example, since the user may take various postures while using the electronic device 101, the transmit beam or the receive beam of the electronic device 101 may not change notably.

If the user's posture for using the electronic device 101 changes, the angle between the electronic device 101 and the gNB may change and the existing optimal receive beam may not be optimal any more. According to an embodiment of the disclosure, the electronic device 101 may measure the receive signal quality using a smaller number of the receive beams than the formable receive beams, and then predict optimal receive beam position and level merely with a smaller number of bases using the change of basis.

Now, determining the receive beam of the electronic device 101 is explained, to ease the understanding. However, an embodiment to be described may be realized to determine the receive beam of the gNB for the uplink communication.

Figure 7:
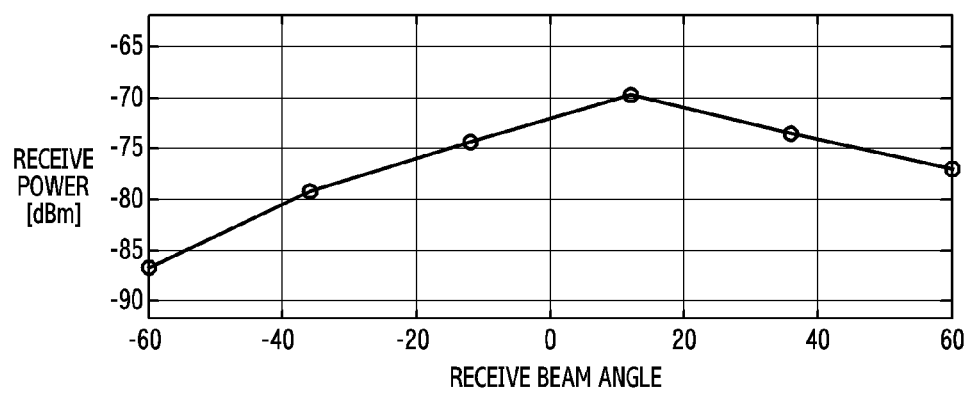
FIG. 7 illustrates a diagram of an example of receive signal quality changes based on a receive beam of an electronic device according to an embodiment.

FIG. 7 illustrates a diagram of an example of receive signal quality changes based on a receive beam of an electronic device according to an embodiment. Referring to FIG. 7, if an electronic device (e.g., the electronic device 101 of FIG. 1) may form NR-ary receive beams according to an embodiment, each receive beam may be expressed as a direction vector of a unit size on three-dimensional coordinates. If the receive signal quality of each receive beam is measured for a specific transmit beam, correlation of the receive signal quality may be high between adjacent receive beams and correlation between distant receive beams may be low. Contiguity between two receive beams may be determined by an absolute value of the angle between the direction vectors.

For example, assuming that the electronic device 101 searches a [−60°, +60°] interval based on the origin using six beams, a maximum receive strength value may be measured at any one receive beam with respect to a particular transmit beam and the measured receive strength may decrease as moving away from the receive beam as shown in FIG. 7. A maximum receive signal quality −70 dBm may be observed at the receive beam angle of about +13°, and the observed receive strength may decrease as moving away from about +13°. At −60° of the greatest difference, the receive signal quality may be about −87 dBm which is the minimum value.

Figure 8:
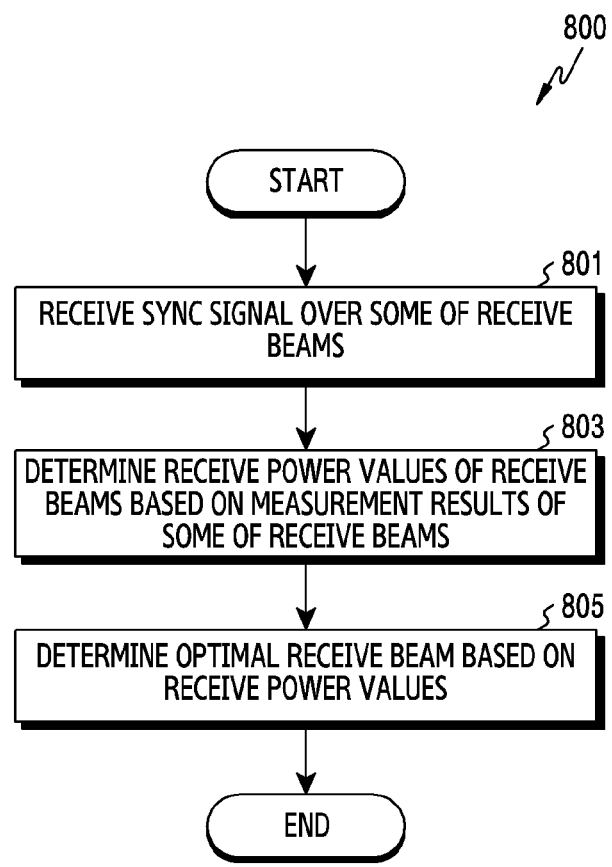
FIG. 8 illustrates a diagram of a flowchart for determining an optimal receive beam in an electronic device according to an embodiment.

FIG. 8 illustrates a diagram of a flowchart 800 for determining an optimal receive beam in an electronic device according to an embodiment.

An operating entity of the flowchart 800 of FIG. 8 may be understood as the electronic device 101 or the component (e.g., the processor 120 of FIG. 1) of the electronic device 101.

Referring to FIG. 8, according to an embodiment, in operation 801, the electronic device 101 (e.g., the processor 120 of FIG. 1) may receive a sync signal (e.g., a primary synchronization signal (PSS) or a secondary synchronization signal (SSS)) over some of receive beams. The sync signal is an example of a signal for measuring the receive signal quality of the SSB. Alternatively or additionally to the sync signal, the electronic device may receive a reference signal in the PBCH of the SSB. Some of the receive beams may be predefined or adaptively selected. The electronic device 101 may acquire a measurement result (e.g., receive signal quality values) of at least one sync signal received using at least one receive beam which is part of the receive beams.

According to an embodiment, in operation 803, the electronic device 101 may determine receive signal quality values of the receive beams based on the measurement results of some of the receive beams. The receive signal quality values of the receive beams determined from the measurement result of at least one receive beam may be understood as predicted values. Through the prediction, the receive signal quality values may be determined for more receive beams (e.g., all of the receive beams) than the receive beams (e.g., the at least one receive beam used in operation 801) used to receive the sync signal.

According to an embodiment, in operation 805, the electronic device 101 may determine an optimal receive beam based on the receive signal quality values. For example, the electronic device 101 may predict at least one receive signal quality value based on correlation of the receive beams. The electronic device 101 may determine the optimal receive beam based on the measured at least one receive signal quality value or the predicted at least one receive signal quality value.

As described in the embodiment of FIG. 8, the electronic device may determine the optimal receive beam. The operations of FIG. 8 may be carried out in various situations. For example, the operations of FIG. 8 may be performed to determine an initial beam pair, or to change at least one of the beam pair.

According to an embodiment, the operations of FIG. 8 may be performed if the electronic device initially accesses the gNB. In this case, the electronic device may detect an optimal receive beam for a gNB transmit signal, and acquire downlink synchronization. For example, the electronic device may identify a frequency band used by the gNB through energy detection, and acquire the downlink synchronization by detecting the sync signal on a raster basis. To determine the transmit beam of the gNB, the electronic device may repeat the operations of FIG. 8 on a plurality of transmit beams, and select a transmit beam which exhibits the maximum receive signal quality value.

According to another embodiment, the operations of FIG. 8 may be performed to reselect the receive beam in the communication. For example, the reselection of the receive beam may be triggered by any one of communication quality deterioration, link failure detection, or packet error rate increase. The receive beam may be reselected fast, merely by measuring some receive beam as shown in FIG. 8.

According to yet another embodiment, the operations of FIG. 8 may be performed to track the receive beam in the communication. For example, if the transmission period of the SSB set arrives, the electronic device may identify whether there is a receive beam exhibiting a better quality, by executing the operations of FIG. 8, even without communication quality deterioration. In this case, the electronic device may select at least one receive beam, as some receive beam used in operation 801, near the current receive beam. Thus, the optimal receive beam may be continuously tracked by observing a wider range than one receive beam.

As shown in FIG. 8, the electronic device may acquire the receive signal quality values of all of the receive beams using the receive signal quality values of some of the receive beams. For example, NS-ary (NS≤NR) receive beams of NR-ary receive beams may be used for the measurement. To acquire information of the whole space using the NS-ary receive beams sampled from the NR-ary receive beams, it may be advantageous to select the beams of the lowest correlation. The following explanations provide an embodiment for receiving a sync signal using receive beams selected based on correlations of the receive beams.

Figure 9:
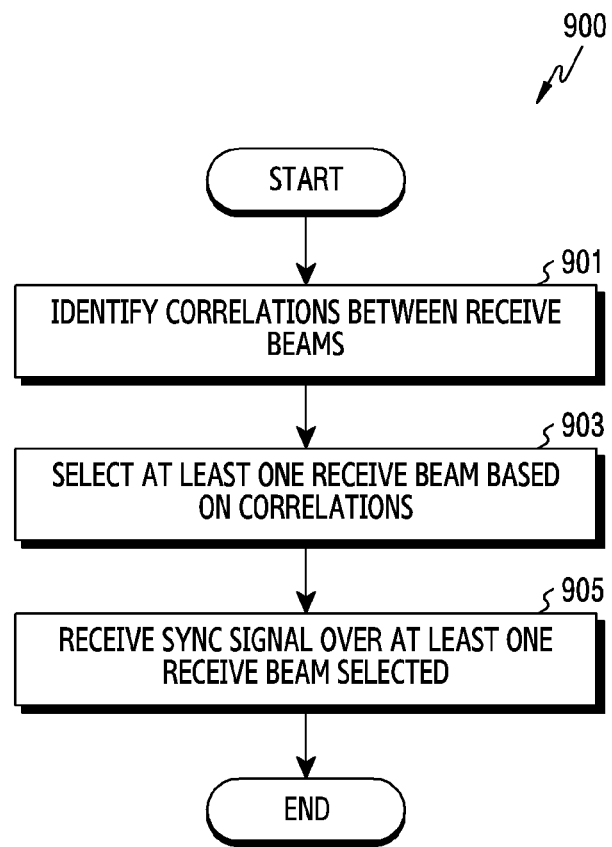
FIG. 9 illustrates a diagram of a flowchart for receiving a sync signal in an electronic device according to an embodiment.

FIG. 9 illustrates a diagram of a flowchart 900 for receive a sync signal in an electronic device according to an embodiment.

Figure 10:
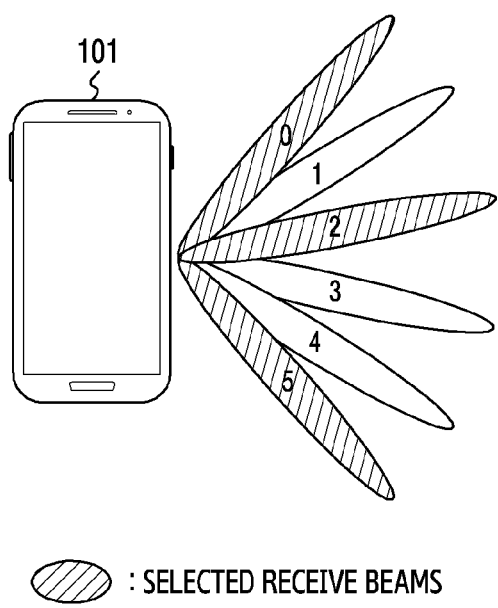
FIG. 10 illustrates a diagram of an example of receive beams selected for measurement in an electronic device according to an embodiment.

FIG. 10 illustrates a diagram of an example of receive beams selected for measurement in an electronic device according to an embodiment.

An operating entity of the flowchart 900 of FIG. 9 may be understood as the electronic device 101 or the component (e.g., the processor 120 of FIG. 1) of the electronic device 101.

Referring to FIG. 9 and FIG. 10, according to an embodiment, in operation 901, the electronic device 101 (e.g., the processor 120 of FIG. 1) may identify correlations between receive beams. The correlations between the receive beams may be identified based on pointing angles of the receive beams. For example, the correlation between two receive beams may vary according to a difference of the pointing angles of the two receive beams. For example, the greater difference of the pointing angles, the lower correlation.

According to an embodiment, in operation 903, the electronic device 101 may select at least one receive beam based on the correlations. For example, the electronic device 101 may select the receive beams to minimize the correlations of the selected receive beams. According to an embodiment, the electronic device 101 may select the receive beams, wherein a maximum value of the correlation of two receive beams derived from the selected receive beams falls below a threshold. According to another embodiment, the electronic device 101 may select the receive beams, wherein an average of correlations of receive beams derived from the selected receive beams is minimized or falls below a threshold. For example, the electronic device 101 may select NS-ary receive beams from NR-ary receive beams, wherein the selected receive beams are away from each other as far as possible. For example, as shown in FIG. 10, if NR is 6 and NS is 3, a receive beam #0, a receive beam #2, and a receive beam #5 which are away from each other may be selected. As the NS increases, prediction accuracy rises but the search time and current consumption increase. Hence, it may be advantageous to adequately determine NS according to the number of the receive beams and coverage of the receive beams.

According to an embodiment, in operation 905, the electronic device 101 may receive a sync signal over the at least one receive beam selected. The electronic device 101 may change the receive beam per SSB set and receive the sync signal or a reference signal. For example, if the receive beam #0, the receive beam #2, and the receive beam #5 are selected as shown in FIG. 10, the electronic device 101 may acquire receive signal quality values per transmit beam of the gNB with respect to the receive beam #0, the receive beam #2, and the receive beam #5.

In the embodiment of FIG. 9, the electronic device may identify the correlations of the receive beams and select at least one receive beam based on the correlations. The correlation of the receive beams relies on the pointing angles, and the pointing angles of the receive beams may be determined by a design of an antenna or an RF circuit. For example, the pointing angles of the receive beams, which depend on hardware, may be determined at the design phase of the electronic device. Since the correlation of the receive beams may be fixed, some of the receive beams for the measurement may be predefined. In this case, operation 901 and operation 903 may be replaced by identifying a subset of the predefined receive beams.

According to another embodiment, a plurality of subsets derived from the receive beams may be predefined, and any one subset may be selectively used according to situation. For example, the situation may include at least one of a time allowed to determine the received beam, urgency of a service, and a remaining battery level. In this case, operation 901 and operation 903 may be replaced with selecting one of the subsets of the predefined receive beams.

According to an embodiment, based on measurement results of some receive beams selected from the receive beams, measurement results of the remaining receive beams may be predicted. The measurement results of the remaining receive beams may be predicted in various manners. According to an embodiment, the change of basis may be used.

According to an embodiment, the receive signal quality of the full NR-receive beams may be acquired using the measured receive signal quality values of the NS-receive beams and the change of basis. Any basis, which is orthogonal, may be used for the transform, but some particular bases where information is concentrated in the full dimension may be used to maximize efficiency of the prediction. According to an embodiment of the disclosure, discrete cosine transform (DCT) may be used. The DCT is similar to discrete Fourier transform (DFT) and its resultant value may reside in real numbers. The DCT may be implemented with less complexity by decomposing calculation.

According to an embodiment, if an error between an inverse of the DCT (iDCT) of a first matrix of a specific size N×M and the receive signal quality of the NS-ary receive beams measured by the electronic device is minimized, a second matrix to restore from the first matrix may be estimated. In this case, the second matrix may represent the predicted receive signal quality values. A cost function for estimating the second matrix may be defined as Equation 1.

$$\|\bar{Y} - S \circ (D^H \hat{X} D')\| \qquad (1)$$

In Equation 1, $\bar{Y}$ denotes a N×M-sized matrix including the receive signal quality values measured by the electronic device, wherein an element at a position corresponding to the measured receive beam has a corresponding receive signal quality value and elements at other positions are 0, S denotes a N×M-sized matrix in which an element at a position corresponding to the measured receive beam is 1 and elements at other positions are 0, ○ denotes a Hadamard product operator, D denotes a DCT matrix of N×M size, D' denotes a DCT matrix of M×M size, and $\hat{X}$ denotes the first matrix of N×M size. In the matrix size N×M, N may denote the number of vertical axis angles of the receive beams, and M may denote the number of horizontal axis angles of the receive beams. If D' is defined as 1, the DCT may be a one-dimensional DCT According to an embodiment, the first matrix which satisfies the cost function of Equation 1 may be determined based on Equation 2.

$$\operatorname*{argmin}_{\hat{X}} \|\bar{Y} - S \circ (D^H \hat{X} D')\| \qquad (2)$$

In Equation 2, $\bar{Y}$ may denotes the N×M-sized matrix including the receive signal quality values measured by the electronic device, wherein the element at the position corresponding to the measured receive beam has the corresponding receive signal quality value and the elements at other positions are 0, S denotes the N×M-sized matrix in which the element at the position corresponding to the measured receive beam is 1 and the elements at other positions are 0, ○ denotes the Hadamard product operator, D denotes the DCT matrix of N×M size, D' denotes the DCT matrix of M×M size, and $\hat{X}$ denotes the first matrix of N×M size. In the matrix size N×M, N may denote the number of the vertical axis angles of the receive beams, and M may denote the number of the horizontal axis angles of the receive beams. If D' is defined as 1, the DCT may be a one-dimensional DCT.

According to an embodiment, if the first matrix is estimated, a matrix including the predicted receive signal quality values may be determined based on Equation 3.

$$\hat{Y} = D^H \hat{X} D' \qquad (3)$$

In equation 3, $\hat{Y}$ may denotes a N×M-sized matrix including the predicted receive signal quality values, D denotes the DCT matrix of N×M size, D' denotes the DCT matrix of M×M size, and $\hat{X}$ denotes the first matrix of N×M size. In the matrix size N×M, N may denote the number of the vertical axis angles of the receive beams, and M may denote the number of the horizontal axis angles of the receive beams. If D' is defined as 1, the DCT may be a one-dimensional DCT.

Since the receive signal quality is measured only for the NS-ary receive beams of the N×M-ary receive beams, the cost function of Equation 1 may be an underdetermined system. Since the cost function is the underdetermined system, a solution of the first matrix satisfying Equation 2 may not be one. To specify a single solution, the correlations of the receive signal qualities of the receive beams may be adopted. An example of a two-dimensional DCT result of the matrix including the receive signal qualities are shown in FIG. 11.

FIG. 11 illustrates a diagram of an example of change-of-basis results of measurement values according to an embodiment.

Referring to FIG. 11, a matrix 1110 may include receive signal quality values, and a matrix 1120 may represent a DCT result of the matrix 1110. If the matrix 1120 is considered as one signal, a direct current (DC) component is at a top left end 1120a, and other low frequency component are near the top left end 1120a and high frequency components are near a bottom right end 1120b.

According to an embodiment, since an approximate outline of the signal may be acquired using the low frequency component, the low frequency components at the top left end may be relatively more important for the signal recovery. Since the signal corresponds to the set of the receive signal quality values in the disclosure, dominant elements of the first matrix may be estimated one by one, instead of estimating the full iDCT of the first matrix. The electronic device may estimate the element indicating the DC component at the top left end of the first matrix to minimize the cost function, and then estimate a next element value by moving in a predefined order (e.g., in zigzags). Determining the element by moving in the predefined order may be expressed as pseudo code of Table 1.

TABLE 1 for i = 1:W $$\operatorname*{argmin}_{\hat{x}_i} \|\bar{Y} - S \circ (D^H \hat{X} D')\|$$

According to an embodiment, in Table 1, i may denote an index of the elements of the first matrix, W may denote the number of DCT coefficients to estimate, $x_i$ may denote an i-th element in the predefined order, $\overline{Y}$ may denotes the N×M-sized matrix including the receive signal quality values measured by the electronic device, wherein the element at the position corresponding to the measured receive beam has the corresponding receive signal quality value and the elements at other positions are 0, S denotes the N×M-sized matrix in which the element at the position corresponding to the measured receive beam is 1 and the elements at other positions are 0, ○ denotes the Hadamard product operator, D denotes the DCT matrix of N×N size, D' denotes the DCT matrix of M×M size, and $\hat{X}$ denotes the first matrix of N×M size. In the matrix size N×M, N may denote the number of the vertical axis angles of the receive beams, and M may denote the number of the horizontal axis angles of the receive beams. If D' is defined as 1, the DCT may be a one-dimensional DCT.

Figure 12:
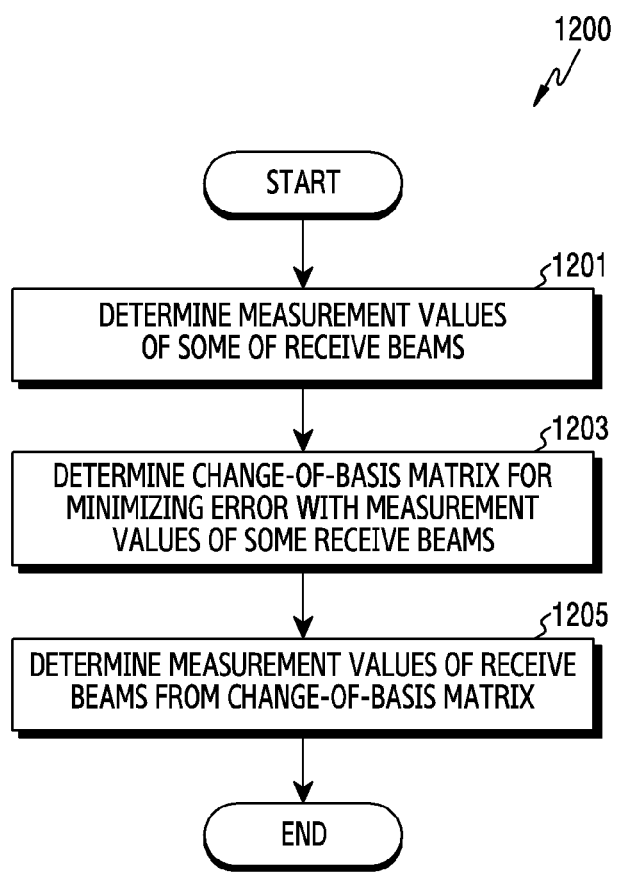
FIG. 12 illustrates a diagram of a flowchart for determining an optimal receive beam using change of basis in an electronic device according to an embodiment.
Figure 13:
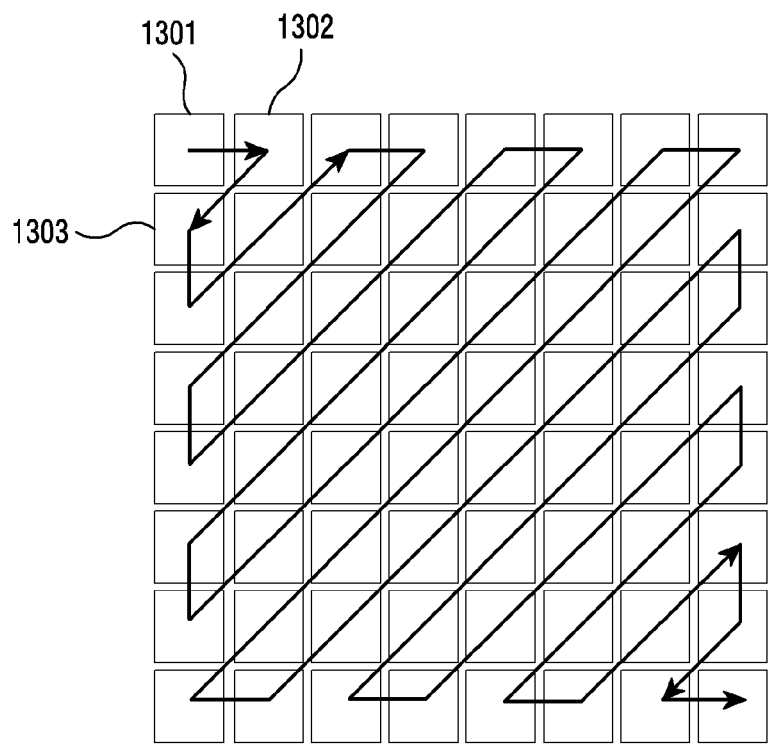
FIG. 13 illustrates a diagram of an example of a sequence for calculating elements of a change-of-basis matrix according to an embodiment.

FIG. 12 illustrates a diagram of a flowchart 1200 for determining an optimal receive beam using change of basis in an electronic device according to an embodiment. FIG. 13 is a diagram illustrating an example of a sequence for calculating elements of a change-of-basis matrix according to an embodiment. An operating entity of the flowchart 1200 of FIG. 12 may be understood as the electronic device 101 or the component (e.g., the processor 120 of FIG. 1) of the electronic device 101.

Referring to FIG. 12 and FIG. 13, according to an embodiment, in operation 1201, the electronic device 101 (e.g., the processor 120 of FIG. 1) may determine measurement values of some of receive beams. The electronic device 101 may receive a sync signal or a reference signal using some of the receive beams, and determine the measurement value per some receive beam with respect to the received sync signal or reference signal.

According to an embodiment, in operation 1203, the electronic device 101 may determine a change-of-basis matrix for minimizing an error with the measurement value of some receive beams. The electronic device 101 may determine the change-of-basis matrix, to minimize an error between element values corresponding to positions of some receive beams selected for the measurement from an inverse change-of-basis matrix and the measurement results of the some receive beams. According to an embodiment, the electronic device 101 may sequentially determine elements of the change-of-basis matrix. For example, as shown in FIG. 13, the electronic device 101 may determine the element values in zigzags, for example, in order of a first left and first top element 1301, a second left and first top element 1302, and a first left and second top element 1303. According to an embodiment, only some elements (e.g., W-ary elements) of the change-of-basis matrix may be estimated, rather than all the elements.

According to an embodiment, in operation 1205, the electronic device 101 may determine measurement values of the receive beams from the change-of-basis matrix. After determining the change-of-basis matrix, the electronic device 101 may determine a matrix including prediction values of the measurement values of the receive beams by inverting the change-of-basis matrix. For example, the electronic device 101 may perform iDCT on the change-of-basis matrix.

According to an embodiment, in determining the change-of-basis matrix, the electronic device may sequentially estimate the elements. Each element value may be estimated based on a mathematical algorithm. For example, each element value may be estimated using gradient descent of the cost function. For example, the electronic device may set the element value to estimate to an initial value, calculate an error, adjust (e.g., increase or decrease) the element value to reduce the error, repeatedly adjust the element value, and thus acquire a value which minimizes the error. According to an embodiment, the initial value may be defined variously. For example, the initial value may be defined to a fixed value, or may be adaptively selected based on a previous optimal beam.

According to an embodiment, in determining the change-of-basis matrix, the electronic device 101 may estimate all of the elements, or only some elements. Other element values than the some elements estimated may be determined to 0. If estimating only some elements, for example, if the number W of the some elements is excessively greater than the number NS of the measured receive beams, overfitting may cause performance degradation. The matrix including the predicted receive signal quality values may be acquired by using iDCT of the determined change-of-basis matrix, and the receive beam corresponding to the position of the maximum receive signal quality value may be determined as an optimal receive beam.

Figure 14:
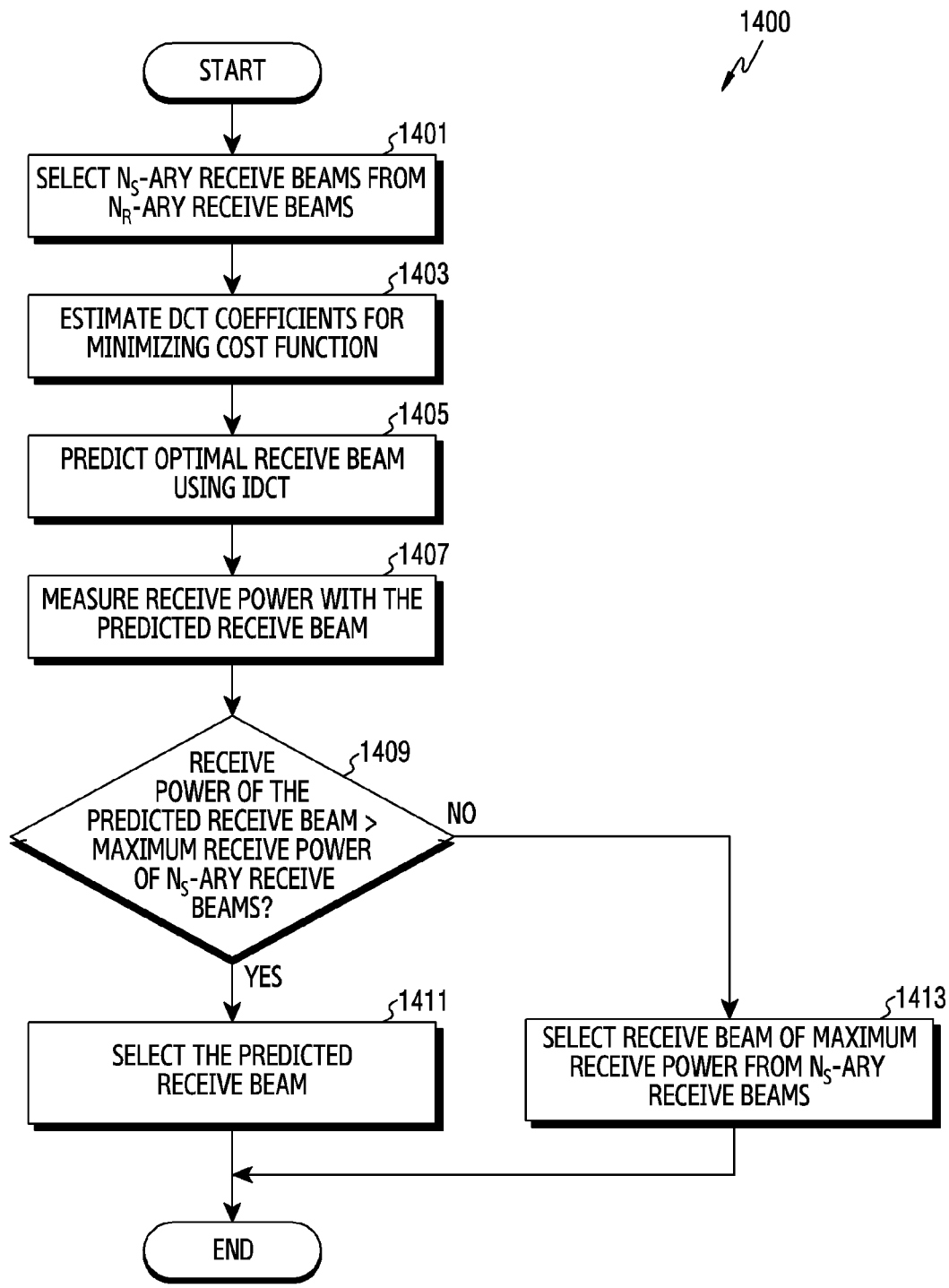
FIG. 14 illustrates a diagram of another flowchart for determining an optimal receive beam in an electronic device according to an embodiment.

FIG. 14 illustrates a diagram of another flowchart 1400 for determining an optimal receive beam in an electronic device according to an embodiment.

Figure 15:
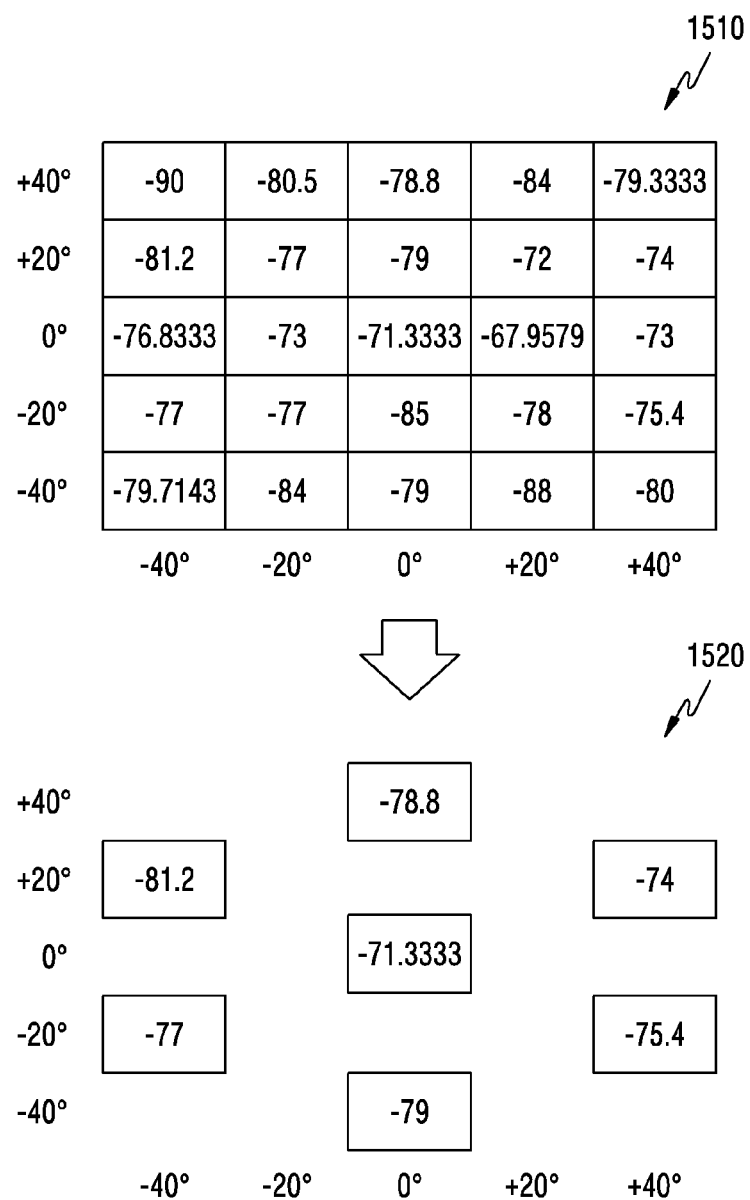
FIG. 15 illustrates a diagram of an example of measurement values of sampled receive beams according to an embodiment.

FIG. 15 illustrates a diagram of an example of measurement values of sampled receive beams according to an embodiment.

FIG. 16 illustrates a diagram of an example of predicted measurement values determined from a change-of-basis matrix according to an embodiment.

An operating entity of the flowchart 1400 of FIG. 14 may be construed as the electronic device 101 or the component (e.g., the processor 120 of FIG. 1) of the electronic device 101.

Referring to FIG. 14, FIG. 15, and FIG. 16, according to an embodiment, in operation 1401, the electronic device 101 (e.g., the processor 120 of FIG. 1) may select NS-ary receive beams from NR-ary receive beams. For example, as shown in FIG. 15, five horizontal angles (e.g., −40°, −20°, 0°, +20°, +40°) and five vertical angles (e.g., −40°, −20°, 0°, +20°, +40°) may be supported, and seven receive beams may be selected from 25 receive beams. In FIG. 15, three angles are selected on the horizontal axis, two angles are selected on the vertical axis, the angles are selected at equal intervals on the horizontal axis and the vertical axis respectively, and accordingly distances between the selected angles may be maximized. As a result, only seven receive signal quality values 1520 of the whole receive signal quality values 1510 may be measured.

According to an embodiment, in operation 1403, the electronic device 101 may determine DCT coefficients for minimizing a cost function. For example, the electronic device 101 may estimate the DCT coefficients based on the seven receive signal quality values using the gradient descent. If the number W of the estimated coefficients is 10, a change-of-basis matrix (e.g., a DCT matrix) including only ten element values from a top left element may be estimated as shown in a matrix 1610 of FIG. 16.

According to an embodiment, in operation 1405, the electronic device 101 may predict an optimal receive beam, using the iDCT. For example, referring to FIG. 16, the electronic device 101 may acquire a matrix 1620 by using the iDCT of the matrix 1610. Positions of elements of the matrix 1620 may indicate the receive beams respectively, and each element value may indicate a receive signal quality value predicted for a corresponding receive beam. In the matrix 1620 of FIG. 16, since the value of the third row and the fourth column is the maximum −70.9651 dBm, the receive beam corresponding to the third row and the fourth column may be predicted as the optimal receive beam.

According to an embodiment, in operation 1407, the electronic device 101 may measure a receive signal quality with the predicted receive beam. Since the optimal receive beam selected in operation 1405 is based on the prediction, the electronic device 101 may actually measure the receive signal quality for the predicted receive beam, to make sure of the result. For example, the electronic device 101 may receive a sync signal or a reference signal from the gNB using the predicted receive beam, and measure the receive signal quality.

According to an embodiment, in operation 1409, the electronic device 101 may compare the receive signal quality of the predicted receive beam with a maximum value of the receive signal qualities of the NS-ary receive beams. For example, referring to FIG. 15, the measured receive signal quality of the predicted receive beam may be −67.9579 dBm and maximum value of the receive signal qualities of the NS-ary receive beams may be −71.3333 dBm.

According to an embodiment, if the receive signal quality of the predicted receive beam is greater than the maximum value of the receive signal qualities of the NS-ary receive beams in operation 1409—YES, the electronic device 101 may select the predicted receive beam in operation 1411. For example, since −67.9579 dBm is greater than −71.3333 dBm in FIG. 15 and FIG. 16, the electronic device 101 may determine the selected receive beam based on the prediction, as the optimal receive beam.

According to an embodiment, if the receive signal quality of the predicted receive beam is smaller than or equal to the maximum value of the receive signal qualities of the NS-ary receive beams in operation 1409—NO, the electronic device 101 may select the receive beam of the maximum receive signal quality from the NS-ary receive beams in operation 1413. For example, unlike the examples of FIG. 15 and FIG. 16, if the maximum value of the receive signal qualities of the NS-ary receive beams is greater than the receive signal quality of the receive beam selected based on the prediction, the electronic device 101 may select the receive beam of the maximum receive signal quality among the NS-ary receive beams, as the optimal receive beam.

In the embodiment of FIG. 14, the electronic device may measure the receive signal quality of the receive beam selected based on the prediction. If the receive beam selected based on the prediction is one of the NS-ary receive beams selected in operation 1401, the electronic device may omit operation 1407 and perform operation 1409 according to another embodiment. Since the predicted receive beam is already measured, the electronic device may shorten the time for determining the optimal beam, by omitting re-measuring the receive beam. In the embodiment of FIG. 14, the electronic device may select the NS-ary receive beams. NS may be defined as a fixed value or may be adaptively selected. According to an embodiment, the number NS of the receive beams to observe may be adjusted according to a situation as shown in FIG. 17.

FIG. 17 illustrates a diagram of examples of measurement values of sampled receive beams according to an embodiment. FIG. 17 uses nine receive signal quality values 1720a, eight receive signal quality values 1720b, and seven receive signal quality values 1720c of receive signal quality values 1710 of the whole receive beams.

For example, if the predicted receive beam is not better than the observed NS-ary receive beams more often (e.g., operation 1409—NO of FIG. 14 is determined more often than a first threshold), the electronic device may increase NS to raise prediction accuracy. Referring to FIG. 17, if changing the predicted result based on the eight receive signal quality values 1720b is repeated over a specific number of times, the electronic device may increase NS to use the nine receive signal quality values 1720a.

For example, if the predicted receive beam is better than the observed NS-ary receive beams more often (e.g., operation 1409—YES of FIG. 14 is determined more often than a second threshold), the electronic device may decrease NS to save the time. Referring to FIG. 17, if maintaining the predicted result based on the eight receive signal quality values 1720b is repeated over a specific number of times, the electronic device may decrease NS to use the seven receive signal quality values 1720c.

According to an embodiment of the disclosure, a method for operating an electronic device (e.g., the electronic device 101 of FIG. 1, the gNB of FIG. 2) may include receiving a sync signal or a reference signal over some of receive beams, determining receive signal quality values of the receive beams based on measurement results of some of the receive beams, and determining an optimal receive beam based on the receive signal quality values.

According to an embodiment of the disclosure, determining the receive signal quality values may include predicting the receive signal quality values based on correlations of the receive beams.

According to an embodiment of the disclosure, some of the receive beams may be determined to minimize correlations of the some receive beams.

According to an embodiment of the disclosure, determining the receive signal quality values may include determining a first matrix, determining a second matrix, using an inverse change of basis of the first matrix, and identifying values of elements of the second matrix.

According to an embodiment of the disclosure, determining the first matrix may include determining the first matrix to minimize an error between at least one element value corresponding to a position of at least one receive beam of some of the receive beams and at least one receive signal quality value of some of the receive beams among the elements of the second matrix.

According to an embodiment of the disclosure, determining the first matrix may include estimating some of the element values of the first matrix, and determining other elements values to 0.

According to an embodiment of the disclosure, estimating some of the element values may include estimating some of the element values in zigzags from a first left and first top element.

According to an embodiment of the disclosure, the number of the some elements may be adjusted based on the number of occurrences in which a first receive signal quality value measured for a first receive beam corresponding to a maximum value of receive signal quality values predicted based on correlations of the receive beams is smaller than a second receive signal quality value measured for a second receive beam corresponding to a maximum value of receive signal quality values of the measurement results of some of the receive beams.

According to an embodiment of the disclosure, determining the optimal receive beam based on the receive signal quality values may include receiving a sync signal or a reference signal using a first receive beam corresponding to a maximum value of the receive signal quality values, identifying a first receive signal quality value of the first receive beam by measuring the sync signal or the reference signal, and determining the optimal receive beam based on the first receive signal quality value.

According to an embodiment of the disclosure, determining the optimal receive beam based on the first receive signal quality value may include identifying a second receive signal quality value of a second receive beam corresponding to a maximum value of receive signal quality values of the measurement results of some of the receive beams, and if the second receive signal quality value is greater than the first receive signal quality value, selecting the first receive beam as the optimal receive beam, and if the second receive signal quality value is smaller than or equal to the first receive signal quality value, selecting the second receive beam as the optimal receive beam.

Figure 18:
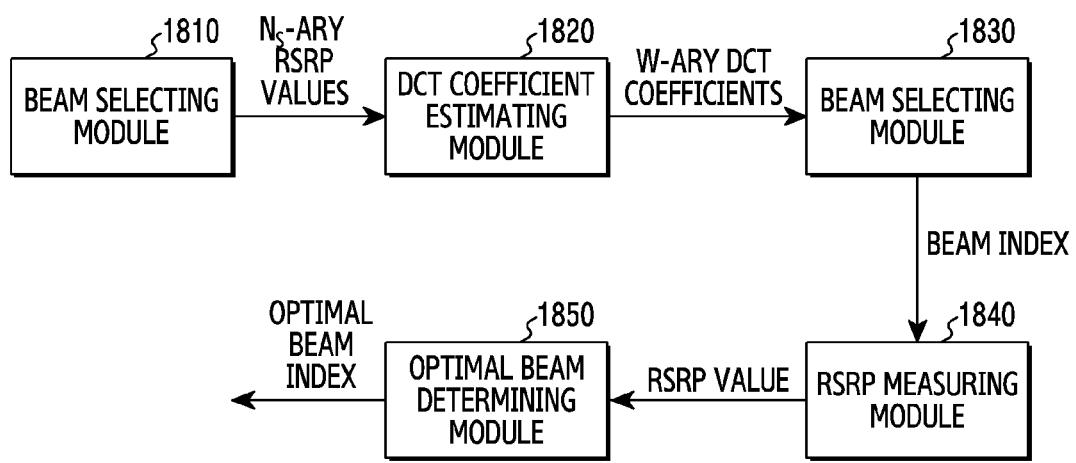
FIG. 18 illustrates a diagram of a block diagram of a logical structure for determining an optimal beam according to an embodiment.

FIG. 18 illustrates a diagram of a block diagram of a logical structure for determining an optimal beam according to an embodiment. At least part of the modules of FIG. 18 may be understood as instructions/code resided in a processor (e.g., the processor 120 of FIG. 1), or as part of circuitry of the processor.

Referring to FIG. 18, a beam selecting module 1810 may perform beam selection and measurement (e.g., operation 1401 of FIG. 14), and output NS-ary reference signal received power (RSRP) values. The NS-ary RSRP values are inputted to a DCT coefficient estimating module 1820, and the DCT coefficient estimating module 1820 may estimate W-ary element values of a DCT matrix (e.g., operation 1403 of FIG. 14). W-ary coefficient values are inputted to a beam selecting module 1830, and the beam selecting module 1830 may select a receive beam based on prediction using the iDCT (e.g., operation 1405 of FIG. 14). An index of the receive beam selected based on the prediction is inputted to an RSRP measuring module 840, and the RSRP measuring module 840 may measure RSRP (e.g., operation 1407 of FIG. 14) of the receive beam selected based on the prediction. The RSRP value of the receive beam selected based on the prediction is inputted to an optimal beam determining module 1850, and the optimal beam determining module 1850 may compare the RSRP measured by the beam selecting module 180 and the RSRP value measured by the RSRP measuring module 1840 and determine an optimal beam (e.g., operations 1409, 1411, and 1413 of FIG. 14), and then output an optimal beam index.

An embodiment above-stated and to be described have been described with the representative receive signal quality value which is the RSRP. An embodiment may be realized using other parameter values indicating the signal quality such as signal to noise ratio (SNR), signal to interference and noise ratio (SINR), carrier to interference and noise ratio (CINR), reference signal received quality (RSRQ) and/or received signal strength indicator (RSRQ), or other value related to the RS.

The above embodiments have been described on assumption that an antenna of the electronic device is a two-dimensional array type. However, the embodiments may be applied to other environments in a similar manner.

For example, the above-stated embodiments may be applied to a single one-dimensional array antenna, a plurality of one-dimensional array antennas, or a plurality of two-dimensional array antennas. The above-stated embodiments may be applied to the plurality of the one-dimensional or two-dimensional array antennas, which are disposed on an upper side, a lower side, a left side, and/or a right side of the electronic device and exhibit sufficient correlations. The above-stated embodiments may be applied to the plurality of the two-dimensional array antennas, which form beams with sufficient correlations toward the same direction of boresight.

For example, the above-mentioned embodiments may be applied to different types of the array antennas. If a one-dimensional array patch antenna and a one-dimensional dipole antenna are used and the beam formed by each antenna is steered in the horizontal or vertical direction, the above-mentioned embodiments may be applied. If a two-dimensional array patch antenna and a one-dimensional array dipole antenna are used and the beam formed by each antenna is steered in the horizontal or vertical direction, the above-mentioned embodiments may be applied.

Figure 19:
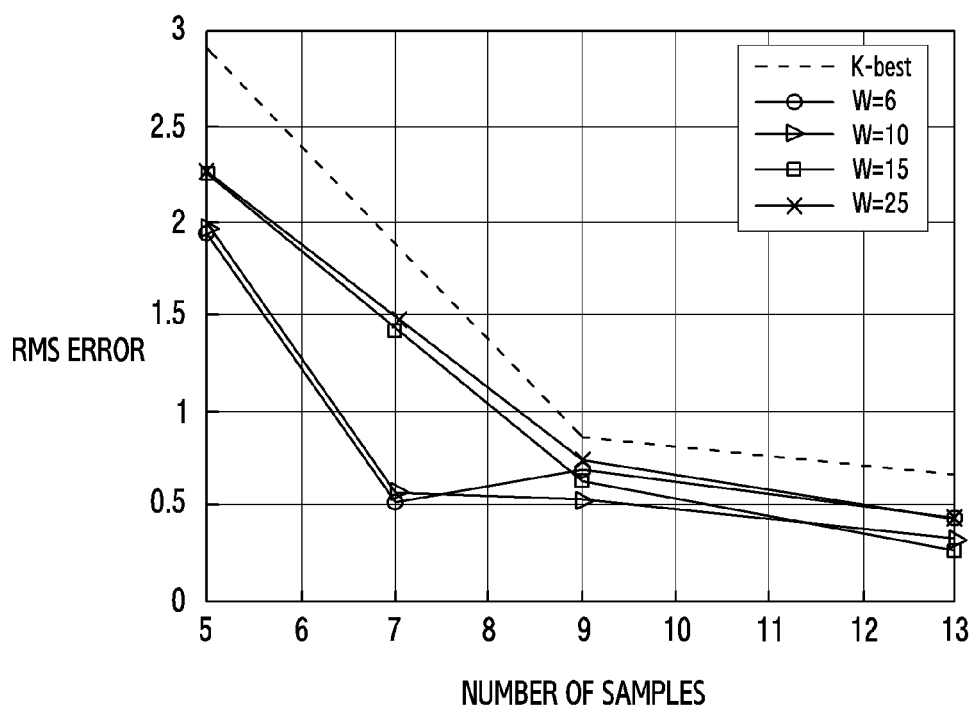
FIG. 19 illustrates a diagram of a graph of optimal beam selection performance according to an embodiment.
Figure 20:
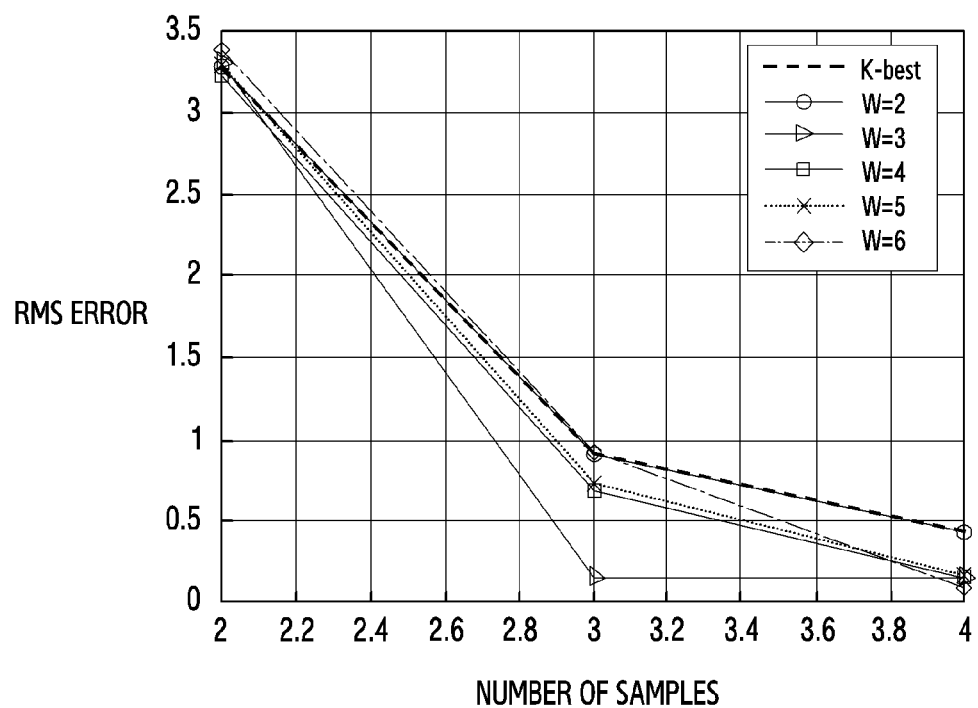
FIG. 20 illustrates a diagram of a graph of optimal beam selection performance according to an embodiment.

FIG. 19 and FIG. 20 illustrate graphs of optimal beam selection performance according to an embodiment. In FIG. 19 and FIG. 20, a difference between the RSRP of the predicted receive beam and the RSRP of the actual optimal receive beam may be expressed as a root-mean-square (RMS) error. RSRP distribution is based on joint Gaussian distribution. The K-best algorithm selects the receive beam of the maximum value from the RSRPs of the NS-ary receive beams, and may correspond to a lower bound of the performance. FIG. 19 shows experiment results if five angles are supported in the horizontal direction and five angles are supported in the vertical direction, and FIG. 20 shows experiment results if six angles are supported in the horizontal direction and one angle is supported in the vertical direction. Referring to FIG. 19 and FIG. 20, both of the one-dimensional beam and the two-dimensional beam achieve better performance than the K-best algorithm, by selecting the DCT coefficients in an appropriate number.

A method and an electronic device according to an embodiment may reduce the number of measurements for determining an optimal beam, by determining the optimal beam using measurement results of some of receive beams.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B. or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), the element may be coupled with the other element directly (e.g., wired), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating an electronic device supporting a first number of received beams, wherein the first number is an integer, the method comprising:
    selecting a second number of receive beams among the first number of receive beams based on correlations of the second number of receive beams, wherein the second number is smaller than the first number and the second number is an integer;
    receiving a sync signal or a reference signal over the second number of receive beams;
    measuring the second number of receive beams;
    determining receive signal quality values of the first number of receive beams, using a change-of-basis scheme, based on measurement results of the second number of receive beams; and
    determining an optimal receive beam among the first number of receive beams based on the receive signal quality values.

2. The method of claim 1, wherein the second number of receive beams are determined to minimize the correlations of the second number of receive beams.

3. The method of claim 1, wherein determining the receive signal quality values comprises:
    determining a first matrix;
    determining a second matrix, using an inverse change of basis of the first matrix; and
    identifying values of elements of the second matrix.

4. The method of claim 3, wherein determining the first matrix comprises:
    determining the first matrix to minimize an error between at least one element value corresponding to a position of at least one receive beam of the second number of receive beams and at least one receive signal quality value of the second number of receive beams among the elements of the second matrix.

5. The method of claim 3, wherein determining the first matrix comprises:
    estimating some of a number of element values of the first matrix; and
    determining other elements values to 0.

6. The method of claim 5, wherein estimating some of the element values comprises:
    estimating some of the element values in zigzags from a first left and first top element.

7. The method of claim 5, wherein a number of the some of the element values is adjusted based on a number of occurrences in which a first receive signal quality value measured for a first receive beam corresponding to a maximum value of receive signal quality values predicted based on correlations of the first number of receive beams is smaller than a second receive signal quality value measured for a second receive beam corresponding to a maximum value of receive signal quality values of the measurement results of the second number of receive beams.

8. The method of claim 1, wherein determining the optimal receive beam based on the receive signal quality values comprises:

receiving the sync signal or the reference signal using a first receive beam corresponding to a maximum value of the receive signal quality values;

identifying a first receive signal quality value of the first receive beam by measuring the sync signal or the reference signal; and determining the optimal receive beam based on the first receive signal quality value.

9. The method of claim 8, wherein determining the optimal receive beam based on the first receive signal quality value comprises:

identifying a second receive signal quality value of a second receive beam corresponding to a maximum value of receive signal quality values of the measurement results of the second number of receive beams;

if the second receive signal quality value is greater than the first receive signal quality value, selecting the first receive beam as the optimal receive beam; and if the second receive signal quality value is smaller than or equal to the first receive signal quality value, selecting the second receive beam as the optimal receive beam.

10. An electronic device comprising:

antenna circuitry including antenna elements forming antenna array and supporting a first number of receive beams wherein the first number is an integer; and a memory; and a processor operatively coupled with the antenna circuitry, wherein the processor is configured to:

select a second number of receive beams among the first number of receive beams based on correlations of the second number of receive beams, wherein the second number of is smaller than the first number of and the second number of is an integer, receive a sync signal or a reference signal over the second number of receive beams, measure the second number of receive beams, determine receive signal quality values of the first number of receive beams, using a change-of-basis scheme based on measurement results of the second number of receive beams, and determine an optimal receive beam among the first number of receive beams based on the receive signal quality values.

11. The electronic device of claim 10, wherein the second number of receive beams are determined to minimize the correlations of the second number of receive beams.

12. The electronic device of claim 10, wherein the processor is configured to:

determine a first matrix;

determine a second matrix, using an inverse change of basis of the first matrix; and identify values of elements of the second matrix.

13. The electronic device of claim 12, wherein the processor is configured to determine the first matrix to minimize an error between at least one element value corresponding to a position of at least one receive beam of the second number of receive beams and at least one receive signal quality value of the second number of receive beams among the elements of the second matrix.

14. The electronic device of claim 12, wherein the processor is configured to:

estimate some of a number of element values of the first matrix; and determine other elements values to 0.

15. The electronic device of claim 14, wherein the processor is configured to estimate some of the element values in zigzags from a first left and first top element.

16. The electronic device of claim 14, wherein a number of the some of the element values is adjusted based on a number of occurrences in which a first receive signal quality value measured for a first receive beam corresponding to a maximum value of receive signal quality values predicted based on correlations of the first number of receive beams is smaller than a second receive signal quality value measured for a second receive beam corresponding to a maximum value of receive signal quality values of the measurement results of the second number of receive beams.

17. The electronic device of claim 10, wherein the processor is configured to:

receive a sync signal or a reference signal using a first receive beam corresponding to a maximum value of the receive signal quality values;

identify a first receive signal quality value of the first receive beam by measuring the sync signal or the reference signal; and determine the optimal receive beam based on the first receive signal quality value.

18. The electronic device of claim 17, wherein the processor is configured to:

identify a second receive beam using a second receive beam corresponding to a maximum value of receive signal quality values of the measurement results of the second number of receive beams;

if a second receive signal quality value is greater than the first receive signal quality value, select the first receive beam as the optimal receive beam; and if the second receive signal quality value is smaller than or equal to the first receive signal quality value, select the second receive beam as the optimal receive beam.

* * * * *